United States Patent [19]

Druliner et al.

[11] 3,852,327

[45] Dec. 3, 1974

[54] SELECTIVE CIS/TRANS ISOMERIZATION OF 2-PENTENENITRILE IN A SOLUTION OF PENTENENITRILE ISOMERS

[75] Inventors: Joe D. Druliner, Orange, Tex.; Charles M. King, Arundel, Del.

[73] Assignee: E. I. du Pont de Nemours and Company, Wilmington, Del.

[22] Filed: Aug. 29, 1973

[21] Appl. No.: 392,514

[52] U.S. Cl. ............................ 260/465.9, 260/465.3
[51] Int. Cl. .......................................... C07c 121/30
[58] Field of Search ................................ 260/465.9

[56] References Cited
UNITED STATES PATENTS

| | | | |
|---|---|---|---|
| 3,551,474 | 12/1970 | Drinkard, Jr. et al. | 260/465.9 |
| 3,686,264 | 8/1972 | Albanese et al. | 260/465.3 |
| 3,697,578 | 10/1972 | Pasquino et al. | 260/465.9 |
| 3,739,011 | 6/1973 | Drinkard, Jr. et al. | 260/465.9 |

*Primary Examiner*—Joseph P. Brust

[57] ABSTRACT

Cis- and trans-2-pentenenitriles in a mixture of pentenenitriles are brought closer to their equilibrium ratio by contacting the mixture with a Lewis acid/Lewis base catalyst composition. By this process trans-2-pentenenitrile can be removed from a mixture containing mainly 3-pentenenitrile by isomerizing the trans-2-pentenenitrile to cis-2-pentenenitrile and removing the more volatile cis isomer by fractional distillation. There is substantially no isomerization of 3-pentenenitrile to cis- or trans-2-pentenenitrile.

8 Claims, No Drawings

SELECTIVE CIS/TRANS ISOMERIZATION OF 2-PENTENENITRILE IN A SOLUTION OF PENTENENITRILE ISOMERS

BACKGROUND OF THE INVENTION

The production of adiponitrile, the important polyamide intermediate, by hydrocyanation of butadiene in the presence of a zerovalent nickel catalyst to yield a number of pentenenitriles including mainly 3-pentenenitrile and further hydrocyanation of 3-pentenenitrile to give adiponitrile is the subject of a number of patents, in particular, U.S. Pat. Nos. 3,496,215, 3,496,217 and 3,496,218. Along with production of 3-pentenenitrile in the hydrocyanation of butadiene there are also obtained varying amounts of cis-and trans-2-pentenenitriles. These 2-pentenenitriles are found to be detrimental to catalyst efficiency in the hydrocyanation of 3-pentenenitrile or 4-pentenenitrile to adiponitrile. For the purposes herein, catalyst efficiency is defined as moles of adiponitrile produced per mole of zerovalent nickel catalyst charged. Trans-2-pentenenitrile cannot be removed satisfactorily from a mixture of pentenenitriles by fractional distillation, for example, because its boiling point is too close to that of other pentenenitriles such as 3-pentenenitrile or 4-pentenenitrile.

A method has been described in U.S. Pat. No. 3,564,040 for removing trans-2-pentenenitrile in the course of hydrocyanating 3-pentenenitrile or 4-pentenenitrile with a zerovalent nickel catalyst by isomerizing trans-2-pentenenitrile to the more volatile cis-2-pentenenitrile which in turn can be removed from the mixture by fractional distillation. A shortcoming of the process described in U.S. Pat. No. 3,564,040 is that under the conditions for hydrocyanation, that is, in the presence of hydrogen cyanide and the zerovalent nickel catalyst, in addition to the isomerization of trans-2-pentenenitrile to cis-2-pentenenitrile there is also some isomerization of 3-pentenenitrile to 2-pentenenitrile. A process for the efficient removal of undesired 2-pentenenitriles from the reaction system while avoiding any further yield loss by isomerization of the desired 3-pentenenitrile intermediate to the undesired 2-pentenenitriles has therefore been sought.

SUMMARY OF THE INVENTION

It has now been found that the ratio of cis-2-pentenenitrile to trans-2-pentenenitrile in a mixture of these pentenenitriles with other pentenenitriles can be brought closer to the equilibrium cis/trans ratio by contacting the mixture with a Lewis acid/Lewis base catalyst composition with substantially no isomerization of 3-pentenenitrile to cis- or trans-2-pentenenitrile. The process involves contacting the pentenenitrile mixture at a temperature in the range of 25°–200°C., preferably 50°–150°C. with from 0.1 to 50% by weight, preferably 1 to 25% by weight based on the total mixture, of a catalyst consisting essentially of a Lewis acid and a Lewis base, the mole ratio of Lewis acid to Lewis base being from about 5:1 to about 1:5. Lewis acids that can be used include halides of metals found in groups I-B, II-A, II-B, III-B, IV-A, IV-B, V-B, VI-A, VI-B, VII-A and VIII of the Periodic Chart of the Elements as well as triphenyl borane, boric acid and triphenyl borate. Among these, triphenyl borane, boric acid, zinc chloride, ferrous chloride and titanium tetrachloride are preferred. Typical Lewis acids include halides of metals of the group consisting of zinc, cadmium, beryllium, aluminum, gallium, indium, silver, titanium, zirconium, hafnium, germanium, tin, vanadium, niobium, scandium, chromium, molybdenum, tungsten, manganese, rhenium, thorium, erbium, iron and cobalt.

Lewis bases that can be used include organic phosphorus compounds of the formulae $P(OR)_3$ and $P(R_3)$ wherein R is an alkyl or aryl group having up to 18 carbon atoms and preferably those of the formula $PR_3$. Typical Lewis bases include m-tritolylphosphite, p-tritolylphosphite, mixtures of m- and p-tolylphosphite, triethylphosphite, tri-isopropylphosphite, triphenylphosphine, tri-p-tolylphosphine and tri-n-butylphosphine, with the trialkyl and triaryl phosphines being preferred.

The isomerization of the cis/trans-2-pentenenitriles may be practiced concurrently with the process of hydrocyanation of 3-pentenenitrile or 4-pentenenitrile by treatment of a recycle stream of pentenenitrile isomers substantially devoid of hydrocyanation catalyst or hydrogen cyanide or it can be carried out independent of the hydrocyanation reaction. The equilibrium ratio of cis-2-pentenenitrile to trans-2-pentenenitrile is approximately 0.84 and as will be seen in the examples to follow, this ratio is rapidly approached by the use of catalyst combinations of this invention.

The process of this invention can be carried out batchwise or continuously at subatmospheric, atmospheric or superatmospheric pressure. Normally it is convenient and preferred to carry out the reaction at atmospheric pressure. The process of this invention is especially useful in the hydrocyanation of 3-pentenenitrile to adiponitrile, an intermediate to hexamethylenediamine in the manufacture of the important polyamides.

DESCRIPTION OF THE PREFERRED EMBODIMENTS

The process of this invention is further illustrated in the examples to follow. For Examples 1–9 summarized in Table I all weighings of solid reagents were carried out in a Vacuum Atmosphere-Dry Laboratory nitrogen atmosphere dry box to minimize contamination from air. Reactions were run using pyrex glass sample bottles fitted with serum caps for removing aliquots and introducing liquid reagent (Lewis base) by syringe.

Analyses of products for pentenenitrile isomer distribution were done by laboratory gas chromatographic analysis. A typical pentenenitrile solution prior to addition of catalyst components had the following composition: trans-2-pentenenitrile, 8.11%; cis-2-pentenenitrile, 0%; cis-2-methyl-2-butenenitrile, 5.0%; trans-2-methyl-2-butenenitrile, 0%; 3-pentenenitrile and 4-pentenenitrile, 86.89%. Results with a number of Lewis acid/Lewis base combinations are summarized in Table I.

TABLE I

Isomerization of Pentenenitrile Mixtures [1]

| Example | Lewis Base (Wt.%) | Lewis Acid (Wt.%) | Temp. | Time (hr) | 3,4PN t=0 | 3,4PN[3] final time | c-2PN/t-2PN t=0 | c-2PN/t-2PN[2] final time |
|---|---|---|---|---|---|---|---|---|
| 1 | PØ₃ – 3.4 | AlCl₃ – 0.97 | 60°C. | 21 | 84.96 | 84.99 | 0 | 0.83 |
| 2 | do. | ZnCl₂ – 0.99 | do. | do. | do. | 85.34 | 0 | 0.84 |
| 3 | do. | AlCl₃ – 0.97 | 95 | 17 | do. | 84.92 | 0 | 0.81 |
| 4 | do. | ZnCl₂ – 1.8 | do. | 17 | do. | 84.81 | 0 | 0.88 |
| 5 | PBu₃– 2.5 | AlCl₃ – 0.91 | 63 | 16 | do. | 85.37 | 0 | 0.87 |
| 6 | do. 2.7 | ZnCl₂ – 1.0 | do. | do. | do. | 85.37 | 0 | 0.63 |
| 7 | PØ₃ – 0.29 | do. 0.19 | 140 | 120 | 77.04 | 76.92 | 0 | 1.01 |
| 8 | PBu₃– 0.40 | BØ₃ – 0.34 | 141 | 64 | 84.42 | 83.82 | 0 | 1.33 |
| 9 | do. | — | do. | do. | 85.30 | 21.91 | 0 | 0.92 |

Legend: PØ₃—triphenyl phosphine; PBu₃—tri-n-butyl phosphine; BØ₃—triphenyl borane; 3,4PN—3-pentenenitrile/4-pentenenitrile mixture; c-2PN/t-2PN — cis-2-pentenenitrile/*trans*-2-pentenenitrile.

[1] 10 ml. of mixture used in all examples.

[2] Equilibrium c-2PN/t-2PN ratio approximately 0.84.

[3] Within limits of analytical data, substantially no change indicated in 3,4PN content, except for Example 9, wherein Lewis acid was omitted.

Examples 10–23

The performance of a number of Lewis acid/Lewis base combinations in effecting isomerization of trans- to cis-2-pentenenitrile is illustrated in Examples 10–23, results of which are summarized in Table II. The general procedure was essentially as described for Examples 1–9.

TABLE II c-2PN/t-2PN Isomerization - Various Lewis Acid/Lewis Base Combinations[1]

| Example | Temp. | Lewis Base (Wt. %)[3] | Lewis Acid[3] | Lewis Acid/Lewis Base Mole Ratio | Half Life[2] |
|---|---|---|---|---|---|
| 10 | 78°C. | PØ₃ – 2.8 | ZnCl₂ | 1.0 | 10 min. |
| 11 | 76 | do. | TiCl₄ | 0.72 | 46 |
| 12 | 75 | do. 2.9 | BØ₃ | 0.97 | 60 |
| 13 | 76 | do. 2.8 | FeCl₂ | 0.70 | ~150 |
| 14 | do. | do. | FeCl₃ | 0.65 | ~150 |
| 15 | do. | do. 2.7 | AlCl₃ | 1.0 | ~150 |
| 16 | 90 | PBu₃– 0.99 | BØ₃ | 1.2 | 2 |
| 17 | do. | do. 1.2 | FeCl₂ | 0.93 | 25 |
| 18 | 88 | do. | — | — | 80 |
| 19 | do. | do. | ZnCl₂ | 1.5 | 80 |
| 20 | do. | do. | B(OH)₃ | 1.2 | 80 |
| 21 | 90 | do. | AlCl₃ | 0.91 | 128 |
| 22 | do. | do. | FeCl₃ | do. | >200 |
| 23 | do. | do. 1.9 | B(OØ)₃ | 0.66 | >200 |

Legend:

(1) All solutions contained 8% t-2PN, 0% c-2PN in 3-pentenenitrile solvent.

(2) Based on time for c-2PN/t-2PN ratio to change from original ratio to equil. ratio.

(3) PØ₃ - triphenyl phosphine; PBu₃ -tri-n-butyl phosphine; BØ₃ -triphenyl borane; B(OØ)₃ - triphenyl borate.

Isomerization of a cis-/trans-2-pentenenitrile mixture of high cis content to one closer to the equilibrium ratio is illustrated in the examples to follow.

Example 24

To a 25 ml. round bottom 3-neck flask equipped with water-cooled condenser, nitrogen sparging line and thermocouple control there was added under nitrogen 2.2 ml. of tri(p-tolyl)phosphite (PTTP), 0.2 g. of AlCl₃ and 6.0 ml. of pentenenitrile (PN) of composition* 98.27% c-2PN, 0.52% t-2PN and 0.87% t-3PN; no c-3PN nor 4PN was observable. The mole ratio of PTTP/AlCl₃/PN was 4.7/1.0/41. Prior to heating, therefore, the composition by weight of the above solution was 67.40% c-2PN, 0.36% t-2PN and 0.59% t-3PN. The mixture was heated at 130°–140°C. for 16 hours after which composition of the mixture was found by gas phase chromatography to be as follows: 40.53% c-2PN; 17.58% t-2PN; 0.66% t-3PN; 0.072% c-3PN and 0.357% 4PN. The c-2PN/t-2PN ratio was 2.3/1.00, much closer to the approximate equilibrium ratio than the original 189/1.0 ratio, illustrating that isomerization of c-2PN to t-2PN had occurred.

*c-2PN - cis-2pentenenitrile; t-2PN - trans-2-pentenenitrile; c-3PN - cis-3-pentenenitrile; t-3PN - trans-3-pentenenitrile; 4PN - 4-pentenenitrile

Example 25

Following the procedure of Example 24, a mixture of 2.0 g. of triphenyl phosphine, 0.2 g. AlCl₃ and 6.0 ml. of c-2PN (composition similar to that in Example 24) was heated at 130°–140°C for 16 hours. Product composition at the end of this time was 40.94% c-2PN; 25.20% t-2PN; 0.49% t-3PN, again illustrating isomerization of c-2PN to t-2PN.

The above procedure was repeated but without addition of the Lewis base, triphenyl phosphine. Prior to heating the PN composition was 94.80% c-2PN, 0.50% t-2PN and 0.83% t-3PN. After heating at 130-140°C. for 16 hours the product composition was 91.96% c-2PN, 1.16% t-2PN and 0.75% t-3PN, indicating isomerization of c-2PN to t-2PN but to a much lower extent than when both the Lewis acid and Lewis base were used.

A further experiment was carried out with 2.0 g. of triphenyl phosphine and 4.98 g. of PN (98.27% c-2PN). Prior to heating the composition by weight of the solution was 70.4% c-2PN, 0.37% t-2PN and 0.62% t-3PN. After heating at 140° C. for 16 hours the product composition was 62.39% c-2PN, 0.44% t-2PN and 0.41% t-3PN, indicating essentially no c-2PN/t-2PN isomerization and some loss of c-2PN to highly colored by-products.

Example 26

Following the procedure of Example 24, 1.03 ml. of PTTP, 0.085 g. $ZnCl_2$ and 3.0 ml. of c-2PN (mole ratio PTTP/$ZnCl_2$/PN - 5.31/1.0/52.5) was heated at 130°–140°C. for 16 hours to give a composition of 46.68% c-2PN, 12.62% t-2PN and 0.38% t-3PN; mole ratio c-2PN/t-2PN = 3.7.

Example 27

Following the procedure of Example 24, a mixture of 0.67 g. of triisopropyl phosphite (3.2 mmoles), 0.085 g. $ZnCl_2$ (0.62 mmole) and 3.0 ml. of c-2PN (31 mmoles) was heated at 130°–140°C. for 16 hours to give 30.3% c-2PN, 11.58% t-2PN and 3.5% t-3PN.

Example 28

Following the procedure of Example 24, a mixture of 0.53 g. of triethyl phosphite (3.2 mmoles), 0.085 g. of $ZnCl_2$ (0.62 mmole) and 3.0 ml. of c-2PN (31 mmoles) was heated at 130°–140°C. for 16 hours to give a composition of 31.75% c-2PN, 23.87% t-2PN and 3.88% t-3PN.

Example 29

The effects of catalyst concentration and time on c-2PN/t-2PN isomerization is illustrated in this example. The runs were carried out at 130°C. following in general the procedure of Example 24. Results are shown in tabular form below.

pentenenitrile, which because of its higher volatility can be readily separated by fractional distillation. A more efficient, steady state hydrocyanation can thus be achieved.

We claim:

1. A process for altering the isomer ratio of cis-2-pentenenitrile to trans-2-pentenenitrile in a product stream consisting essentially of cis-2-pentenenitrile, trans-2-pentenenitrile, 3-pentenenitrile and 4-pentenenitrile, the cis-/trans-2-pentenenitrile ratio not being at the equilibrium ratio and bringing the mixture closer to the equilibrium cis-/trans-2-pentenenitrile ratio while effecting substantially no isomerization of 3-pentenenitrile to 2-pentenenitrile, which comprises contacting the mixture of pentenenitriles at a temperature in the range of 25°–200°C. with from 0.1 to 50% by weight, based on the total reaction mixture, of a catalyst composition consisting essentially of a Lewis acid and a Lewis base, the mole ratio of the Lewis acid to Lewis base being from about 1:5 to about 5:1.

2. The process of claim 1 wherein the Lewis acid is of the group consisting of triphenyl borane, triphenyl borate, boric acid and halides of zinc, cadmium, beryllium, aluminum, gallium, indium, silver, titanium, zirconium, hafnium, germanium, tin, vanadium, niobium, scandium, chromium, molybdenum, tungsten, manganese, rhenium, thorium, erbium, iron and cobalt, and wherein the Lewis base is of the group consisting of organic phosphorus compounds of the formulae $P(OR)_3$ and $PR_3$ wherein R is an alkyl or aryl group having up to 18 carbon atoms.

3. The process of claim 2 wherein the reaction is carried out at a temperature in the range of 50°–150°C.

4. The process of claim 3 wherein the isomerization is carried out in the presence of 1 to 25%, based on the total mixture of the Lewis acid/Lewis base catalyst.

5. The process of claim 4 wherein the Lewis acid is of the group consisting of triphenyl borane, zinc chloride and titanium tetrachloride and the Lewis base is triphenyl phosphine.

TABLE III

| Mole Ratio $ZnCl_2$/PTTP/2PN | 2PN Isomer | % 2PN/Time (hours) | | | | | |
|---|---|---|---|---|---|---|---|
| | | 0 | 1 | 2 | 3 | 4 | 5 | 22 |
| 1:1:10 | c-2PN | 64.6 | 49.0 | 43.5 | 40.0 | 34.4 | 33.4 | 26.1 |
| | t-2PN | 0 | 12.6 | 18.3 | 23.0 | 25.2 | 26.8 | 32.7 |
| 1:3:10 | c-2PN | 42.5 | 30.0 | 25.1 | 22.1 | 19.7 | 18.2 | |
| | t-2PN | 0 | 9.9 | 14.3 | 17.3 | 19.0 | 19.5 | |
| 5:1:10 | c-2PN | 45.0 | 21.9 | 18.0 | 17.3 | 16.6 | | |
| | t-2PN | 0 | 20.6 | 21.2 | 21.6 | 21.1 | | |

As will be evident from the foregoing examples, by the process of this invention the cis-/trans-2-pentenenitrile ratio of a given pentenenitrile mixture can be rapidly brought closer to the equilibrium cis-/trans-2-pentenenitrile ratio. This is of particular utility in hydrocyanation of 3-pentenenitrile wherein the 2-pentenenitriles are known to degrade catalyst efficiency. By use of the process of this invention trans-2-pentenenitrile, which cannot be effectively separated from a 3-pentenenitrile mixture because of close boiling points, can be isomerized rapidly to cis-2-

6. The process of claim 4 wherein the Lewis acid is of the group consisting of triphenyl borane, boric acid, zinc chloride and ferrous chloride and the Lewis base is tri-n-butyl phosphine.

7. The process of claim 5 wherein the cis-2-pentenenitrile in the mixture of pentenenitriles is removed from the mixture by fractional distillation.

8. The process of claim 6 wherein the cis-2-pentenenitrile in the mixture of pentenenitriles is removed from the mixture by fractional distillation.

* * * * *